(12) United States Patent
Mizuno et al.

(10) Patent No.: US 8,331,457 B2
(45) Date of Patent: Dec. 11, 2012

(54) INFORMATION PROCESSING APPARATUS AND METHOD, AND RECORDING MEDIUM AND PROGRAM USED THEREWITH

(75) Inventors: Hiroshi Mizuno, Nagano (JP); Atsuo Yada, Kanagawa (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 12/776,462

(22) Filed: May 10, 2010

(65) Prior Publication Data
US 2010/0220980 A1 Sep. 2, 2010

Related U.S. Application Data

(62) Division of application No. 11/214,729, filed on Aug. 31, 2005.

(30) Foreign Application Priority Data
Sep. 2, 2004 (JP) ................... 2004-255673

(51) Int. Cl.
*H04N 7/12* (2006.01)
(52) U.S. Cl. ................................. 375/240.26
(58) Field of Classification Search ........... 386/36, 386/122; 375/240.26
See application file for complete search history.

(56) References Cited

U.S. PATENT DOCUMENTS

| | | | |
|---|---|---|---|
| 6,507,615 B1 * | 1/2003 | Tsujii et al. | 375/240.04 |
| 6,622,158 B1 | 9/2003 | Koyata et al. | |
| 7,236,526 B1 * | 6/2007 | Kitamura | 375/240.16 |
| 2003/0031251 A1 * | 2/2003 | Koto | 375/240.03 |
| 2003/0128766 A1 * | 7/2003 | Tahara et al. | 375/240.26 |
| 2003/0135550 A1 | 7/2003 | Koyata et al. | |
| 2005/0036550 A1 * | 2/2005 | Koba et al. | 375/240.12 |

FOREIGN PATENT DOCUMENTS

| | | |
|---|---|---|
| JP | 8-265747 | 10/1996 |
| JP | 11-275589 | 10/1999 |
| JP | 2000-224589 | 8/2000 |

* cited by examiner

*Primary Examiner* — David Czekaj
*Assistant Examiner* — Tracy Li
(74) *Attorney, Agent, or Firm* — Oblon, Spivak, McClelland, Maier & Neustadt, L.L.P.

(57) ABSTRACT

An information processing apparatus controls an encoder which performs encoding processing on each of data items in access units forming video data while switching encoding types. The apparatus includes a detector which controls the encoder to perform first path encoding on the video data in accordance with first encoding conditions, the first path encoding being included in the encoding processing, and which detects, as information for use in second path encoding being to be performed on the video data and being included in the encoding processing, encoding types and data amounts of data items in the access units forming the resultant first encoded video data obtained by controlling the encoder to perform the first path encoding.

6 Claims, 9 Drawing Sheets

INFORMATION PROCESSING APPARATUS AND METHOD, AND RECORDING MEDIUM AND PROGRAM USED THEREWITH

CROSS REFERENCES TO RELATED APPLICATIONS

This application is a Division of and is based upon and claims the benefit of priority under 35 U.S.C. §120 for U.S. Ser. No. 11/214,729, filed Aug. 31, 2005, and contains subject matter related to Japanese Patent Application JP 2004-255673 filed in the Japanese Patent Office on Sep. 2, 2004, the entire contents of which are incorporated herein by reference.

BACKGROUND OF THE INVENTION

1. Field of the Invention

The present invention relates to information processing apparatuses and methods, and recording media and programs used therewith, and, in particular, to an information processing apparatus and method which generate encoded video data so that the recording capacity of a recording medium for the encoded video data can be efficiently used up, and which record the encoded video data in the recording medium, and to a recording medium and program used therewith.

2. Description of the Related Art

In authoring apparatuses used in sites where recording media, such as optical discs, are created, each of video data items and audio data items is encoded (compression-coded) by using an MPEG (Moving Picture Experts Group) technique. The authoring apparatuses combine the resultant encoded data items with one another, and record the resultant multistream in recording media.

An authoring apparatus of the above type allocates an amount of bits recordable in a recording medium to each item of data such as video data and audio data, and performs encoding on the item of data so that the data can be recorded within the allocated bit amount.

As a technique for encoding the video data in this case, a technique called "two-path encoding" is disclosed in, for example, Japanese Unexamined Patent Application Publication No. 11-004445.

An overview of "two-path encoding" is described below.

FIGS. 1 and 2 show concepts concerning the entirety of "two-path encoding" of the related art. Specifically, the "two-path encoding" is a technique including provisional (pre-) encoding and main encoding. The provisional encoding is hereinafter referred to as "first path encoding", and the main encoding is hereinafter referred to as "second path encoding". Of the above "two-path encoding", the concept of the first path encoding is shown in FIG. 1, and the concept of the second path encoding is shown in FIG. 2.

As shown in FIG. 1, the first path encoding is executed by an encoder (fixed quantization unit) 1-1 and an external computer 2, and, as shown in FIG. 2, the second path encoding is executed by an encoder 1-2 and the external computer 2. However, actually, in many cases, the encoders 1-1 and 1-2 may be the same device.

At first, the encoder 1-1 in FIG. 1 performs the first path encoding on continuous video data, which is to be recorded on an optical disc (not shown), with predetermined encoding conditions maintained. In the first path encoding, the external computer 2 sequentially detects various types of data, for example, the amount of generated bits, obtained in the first path encoding by the encoder 1-1, in units of frames. In Japanese Unexamined Patent Application Publication No. 11-004445, not the amount of generated bits, itself, but intra AC or ME residual is detected by a functional unit corresponding to the external computer 2.

Next, based on the amount of generated bits detected in each frame, the external computer 2 allocates bits to the frames forming the video data. In other words, the external computer 2 sets, in units of frames, target amounts of bits for use in the second path encoding.

The external computer 2 also assigns picture types for use in the second path encoding.

Assigning the picture types represents assigning encoding types to the frames.

Specifically, in MPEG, by using one encoding type among an I picture (intra-picture), a P picture (predictive-picture), and a B picture (bidirectionally predictive-picture), data in each frame is encoded.

The I picture represents an encoding type in which image data for one frame is directly encoded without using image data in another frame. In other words, the I picture represents an encoding type of intraframe encoding.

The P picture and the B picture represent encoding types of interframe encoding. Specifically, the P picture basically represents an encoding type in which a difference (prediction error) between image data for one frame and image data in a predictive frame of the I or P picture, which temporally precedes the image data for one frame, is obtained and encoded. The B picture basically represents an encoding type in which a difference (prediction error) between image data for one frame and image data in a predictive frame of the I or P picture, which temporally precedes or follows the image data for one frame, is obtained and encoded.

Accordingly, assigning the picture types means assigning each frame to one of the three encoding types, that is, an I picture, a P picture, and a B picture. In other words, it may be said that assigning the picture types is to set up each GOP (group of pictures) structure.

As described above, after the first path encoding, its result is used to perform setting target amounts of bits and assigning picture types in units of frames.

Next, encoding conditions that include at least picture types and target amounts of bits for the frames are set, and second path encoding is executed in accordance with the encoding conditions.

As shown in FIG. 2, the encoder 1-2 performs the second path encoding on the same video data as shown in FIG. 1, and outputs the resultant encoded video data. Specifically, the encoder 1-2 sequentially encodes data items in frames forming the video data so that the data items have picture types assigned by the external computer 2 and target amounts of bits set by the external computer 2. As a result, a bit stream, formed such that encoded frame data items of one of I, B, and P pictures are consecutively located, is output as encoded video data from the encoder 1-2. At this time, the external computer 2 may update the target amounts of bits on the basis of the amounts of generated bits supplied from the encoder 1-2, if necessary.

The "two-path encoding" disclosed in Japanese Unexamined Patent Application Publication No. 11-004445 has been described as an example of a video data encoding technique of the related art.

In addition, other video-data encoding techniques of the related art are also disclosed in, for example, Japanese Unexamined Patent Application Publication No. 11-346365 and Japanese Patent Publication No. 3253971.

In the technique disclosed in Japanese Unexamined Patent Application Publication No. 11-346365, the following first processing to third processing are executed in the order given. Specifically, in the first processing, the first path encoding is performed for all intervals of video data. In the second processing, first path encoding is performed for only a particular interval of the video data. In the third processing, only data of a particular interval of the video data encoded by the first path encoding is replaced by video data encoded by the second path encoding, and the data obtained by the replacement is output as final encoded video data.

In the technique disclosed in Japanese Patent Publication No. 3253971, in the video data encoded by the first path encoding, the amount of bits to be assigned to an interval of the video data in which reduction of bits causes no problem is reduced. The target amount of bits is set so that the reduced amount of bits is assigned to another interval. In accordance with the target amount of bits, the second path encoding is performed.

SUMMARY OF THE INVENTION

However, an authoring apparatus of the related art has a problem in that, even if the techniques of the related art in Japanese Unexamined Patent Application Publication Nos. 11-004445 and 11-346365, and Japanese Patent Publication No. 3253971 are utilized in combination, it is difficult to generate encoded video data so that the capacity of a recording medium is efficiently used up.

Causes of the above problem are described below.

A first cause of the problem is that, in the technique in Japanese Unexamined Patent Application Publication No. 11-004445, the following problem occurs.

In the first path encoding in the technique in Japanese Unexamined Patent Application Publication No. 11-004445, picture types are constantly set and used, having the same cycle without differing due to material.

For example, in the first path encoding in Japanese Unexamined Patent Application Publication No. 11-004445, as shown in FIG. 3, picture types having the same cycle, such as I, B, B, P, B, B, P, B, B, P, B, B, P, B, and B (repetition of the same GOP), are set and used.

In FIG. 3, bars that bear I, B, and P indicate frames to which an I picture, a B picture, and a P picture are respectively assigned. The height of each bar indicates the amount of generated bits or a target amount of bits for a corresponding frame. This can also apply to FIG. 4 (described later).

However, in the second path encoding in Japanese Unexamined Patent Application Publication No. 11-004445, as described above, after performing the first path encoding, the external computer 2 shown in FIGS. 1 and 2 sets picture types for use in the second path encoding by using data detected in the first path encoding. In other words, the external computer 2 sets picture types for use in the second path encoding by changing a picture type in an arbitrary frame from a picture type used in the first path encoding to another picture type in consideration of a scene change point and random access.

For example, as shown in FIG. 4, by changing picture types in the tenth and nineteenth frames from the left from the P picture (FIG. 3) to I picture, the external computer 2 sets picture types for use in the second path encoding. FIG. 4 shows an example of the picture types for use in the second path encoding in the technique in Japanese Unexamined Patent Application Publication No. 11-004445.

As described above, in the technique in Japanese Unexamined Patent Application Publication No. 11-004445, a problem occurs in that picture types used in the first path encoding and the second path encoding do not match.

Specifically, in the technique in Japanese Unexamined Patent Application Publication No. 11-004445, based on the amounts of generated bits in frames which are obtained as the result of the first path encoding, target amounts of bits are set so that the capacity of the recording medium can be used up to an maximum extent. For example, as indicated by the heights of the bars indicating frames, target amounts of bits for the frames are set.

However, in the technique in Japanese Unexamined Patent Application Publication No. 11-004445, a problem occurs in that calculated target amounts of bits have errors because picture types for use in the second path encoding differ from those in the first path which are used as a basis for calculating the target amounts of bits. For example, in the technique in Japanese Unexamined Patent Application Publication No. 11-004445, a problem occurs in that, when picture types are set as shown in FIG. 4, the target amounts of bits for the tenth and nineteenth frames from the left respectively have increases by data amounts d0 and d1 compared with the target amounts of bits set as shown in FIG. 3.

The occurrence of the above problems is the above-described first cause.

In addition, the above-described second cause is as follows. The techniques in Japanese Unexamined Patent Application Publication No. 11-346365 and Japanese Patent Publication No. 3253971 are intended to simply improve image quality, but do not consider the capacity of the recording medium. This is the second cause.

Specifically, in the technique in Japanese Unexamined Patent Application Publication No. 11-346365, the second path encoding is performed in order to improve image quality in a particular interval. Therefore, the amount of data in the particular interval after performing the second path encoding is more than that obtained in the first path encoding in accordance with the degree of improvement in image quality. As a result, irrespective of the capacity of a recording medium, the amount of the entirety of final encoded video data recorded on the recording medium is more than that obtained in the first path encoding.

In addition, in the technique in Japanese Patent Publication No. 3253971, the amount of the entirety of encoded video data, obtained in the first path encoding, is reallocated, and, based on the result of the reallocation, the second path encoding is performed. Therefore, irrespective of the capacity of the recording medium, the amount of the entirety of final (second path) encoded video data is equal to that obtained in the first path encoding.

As described above, in each of the techniques in Japanese Unexamined Patent Application Publication No. 11-346365 and Japanese Patent Publication No. 3253971, the amount of the entirety of final encoded video data recorded in the recording medium is simply equal to that obtained in the first path encoding or increases by improvement in image quality, irrespective of the capacity of the recording medium.

It is the above-described second cause that the final encoded video data, generated by the techniques in the Japanese Unexamined Patent Application Publication No. 11-346365 and Japanese Patent Publication No. 3253971, is not generated so that the capacity of the recording medium is efficiently used up.

The present invention has been made in view of the above circumstances. It is desirable to perform generating encoded video data so that the capacity of a recording medium is efficiently used up, and recording the encoded video data in the recording medium. In other words, it is desirable to perform encoding video data so that very high image quality can be obtained by appropriately allocating a limited amount of data to each frame, and recording the encoded video data in a recording medium.

A first information processing apparatus according to an embodiment of the present invention controls an encoder which performs encoding processing on each of data items in access units forming video data while switching encoding types. The first information processing apparatus includes a detecting means which controls the encoder to perform first path encoding on the video data in accordance with first encoding conditions, the first path encoding being included in the encoding processing, and which detects, as information for use in second path encoding being to be performed on the video data and being included in the encoding processing, encoding types and data amounts of data items in the access units forming the resultant first encoded video data obtained by controlling the encoder to perform the first path encoding.

The first information processing apparatus further include a setting means which, based on the encoding types and data amounts detected in the access units by the detecting means, sets target amounts of bits for the access units by allocating, to the access units, a target amount of bits for the entirety of second encoded video data obtained when the second path encoding is performed on the video data.

The first information processing apparatus may further include an encoding control means which controls the encoder to perform the second path encoding on the video data in accordance with second encoding conditions including the encoding types detected in the access units by the detecting means and the target amount of bits detected in the access units by the setting means.

The first information processing apparatus may further include a display control means which controls a predetermined display device to display, as preview video, video corresponding to the second encoded video data, the video being to be obtained when the second path encoding is performed on the video data in accordance with the second encoding conditions before the control by the encoding control means is initiated.

The first information processing apparatus may further include an input means which is operated by an operator viewing the preview video displayed on the display device under the control of the display control means, and which inputs, into the information processing apparatus, information corresponding to an instruction of the operator, wherein, when the input means inputs first information corresponding to an instruction to initiate the second path encoding, the encoding control means initiates control of the encoder to perform the second path encoding on the video data.

When, before inputting the first information, the input means inputs second information corresponding to an instruction to alter at least part of the second encoding conditions, at least one of the detecting means and the setting means re-executes processing of the at least one of the detecting means and the setting means. The display control means controls the display device to display, as the preview video, the video corresponding to the second encoded video data, the video being to be obtained when the second path encoding is performed on the video data in accordance with the second encoding conditions in which said at least part of the second encoding conditions is altered such that the at least one of the detecting means and the setting means re-executes the processing of the at least one of the detecting means and the setting means. When the input means inputs the first information after the display control means performs the control, the encoding control means initiates control of the encoding means to perform the second path encoding on the video data in accordance with the second encoding conditions in which said at least part of the second encoding conditions is altered such that the at least one of the detecting means and the setting means re-executes the processing of the at least one of the detecting means and the setting means.

A first information processing method according to an embodiment of the present invention controls an encoder which performs encoding processing on each of data items in access units forming video data while switching encoding types. The first information processing method includes the step of controlling the encoder to perform first path encoding on the video data in accordance with predetermined encoding conditions, the first path encoding being included in the encoding processing, and detecting, as information for use in second path encoding being to be performed on the video data and being included in the encoding processing, encoding types and data amounts of data items in the access units forming the resultant first encoded video data obtained by controlling the encoder to perform the first path encoding.

A program in a first recording medium according to an embodiment of the present invention is to be executed by a computer for controlling an encoder which performs encoding processing on each of data items in access units forming video data while switching encoding types. The program in the first recording medium includes the step of controlling the encoder to perform first path encoding on the video data in accordance with predetermined encoding conditions, the first path encoding being included in the encoding processing, and detecting, as information for use in second path encoding being to be performed on the video data and being included in the encoding processing, encoding types and data amounts of data items in the access units forming the resultant first encoded video data obtained by controlling the encoder to perform the first path encoding.

A first program according to an embodiment of the present invention is to be executed by a computer for controlling an encoder which performs encoding processing on each of data items in access units forming video data while switching encoding types. The first program includes the step of controlling the encoder to perform first path encoding on the video data in accordance with predetermined encoding conditions, the first path encoding being included in the encoding processing, and detecting, as information for use in second path encoding being to be performed on the video data and being included in the encoding processing, encoding types and data amounts of data items in the access units forming the resultant first encoded video data obtained by controlling the encoder to perform the first path encoding.

In the first information processing apparatus and method, first recording medium, and first program according to the embodiments of the present invention, an encoder which performs encoding processing on each of data items in access units forming video data is controlled. Specifically, the encoder is controlled to perform first path encoding on the video data in accordance with predetermined encoding conditions, the first path encoding being included in the encoding processing, and encoding types and data amounts of data items in the access units forming the resultant first encoded video data obtained by controlling the encoder to perform the first path encoding are detected as information for use in second path encoding to be performed on the video data, the second path encoding being included in the encoding processing.

A second information processing apparatus according to an embodiment of the present invention records, in a predetermined recording medium, data output from an encoder which performs encoding processing on each of data items in access units forming video data while switching encoding types. The second information processing apparatus has the following features. The second information processing apparatus includes an acquiring means which acquires second encoded video data, and a recording means which records the second encoded video data acquired by the acquiring means in the recording medium. The encoder performs first path encoding on the video data in accordance with first encoding conditions, the first path encoding being included in the encoding processing, and a different information processing apparatus detects encoding types and data amounts of data items in the access units forming the resultant first encoded video data obtained by the first path encoding. By allocating, to each of the access units, a target amount of bits for the entirety of second encoded video data, which is obtained when performing second path encoding on the video data on the basis of the detected encoding types and data amounts in the access units, the second path encoding being included in the encoding processing, the different information processing apparatus sets target amounts of bits for the access units. The second encoded video data is obtained such that the encoder performs the second path encoding on the video data in accordance with second encoding conditions including at least the encoding types detected in the access units by the different information processing apparatus and the target amounts of bits set in the access units by the different information processing apparatus, and, when the second encoded video data is output from the encoder, the acquiring means acquires the second encoded video data.

A second information processing method according to an embodiment of the present invention is an information processing method for recording, in a predetermined recording medium, data output from an encoder which performs encoding processing on each of data items in access units forming video data while switching encoding types. The second information processing method has the following features. The second information processing method includes the steps of acquiring second encoded video data, and recording the acquired second encoded video data in the recording medium. The encoder performs first path encoding on the video data in accordance with first encoding conditions, the first path encoding being included in the encoding processing, and a different information processing apparatus detects encoding types and data amounts of data items in the access units forming the resultant first encoded video data obtained by the first path encoding. By allocating, to each of the access units, a target amount of bits for the entirety of the second encoded video data, which is obtained when performing second path encoding on the video data on the basis of the detected encoding types and data amounts in the access units, the second path encoding being included in the encoding processing, the different information processing apparatus sets target amounts of bits for the access units. The second encoded video data is obtained such that the encoder performs the second path encoding on the video data in accordance with second encoding conditions including at least the encoding types detected in the access units by the different information processing apparatus and the target amounts of bits set in the access units by the different information processing apparatus, and, when the second encoded video data is output from the encoder, the second encoded video data is acquired in the step of acquiring the second encoded video data.

A program in a second recording medium according to an embodiment of the present invention is to be executed by a computer for controlling recording, in a predetermined recording medium, of data output from an encoder which performs encoding processing on each of data items in access units forming video data. The program in the second recording medium has the following features. The program includes the steps of controlling acquisition of second encoded video data, and controlling recording, in the recording medium, of the second encoded video data acquired under the control of the step of controlling the acquisition. The encoder performs first path encoding on the video data in accordance with first encoding conditions, the first path encoding being included in the encoding processing, and a different computer detects encoding types and data amounts of data items in the access units forming the resultant first encoded video data obtained by the first path encoding. By allocating, to each of the access units, a target amount of bits for the entirety of the second encoded video data, which is obtained when performing second path encoding on the video data on the basis of the detected encoding types and data amounts in the access units, the second path encoding being included in the encoding processing, the different computer sets target amounts of bits for the access units. The second encoded video data is obtained such that the encoder performs the second path encoding on the video data in accordance with second encoding conditions including at least the encoding types detected in the access units by the different computer and the target amounts of bits set in the access units by the different computer, and, when the second encoded video data is output from the encoder, the second encoded video data is acquired in the step of controlling the acquisition.

A second program according to an embodiment of the present invention is to be executed by a computer for controlling recording, in a predetermined recording medium, of data output from an encoder which performs encoding processing on each of data items in access units forming video data. The second program has the following features. The second program includes the steps of controlling acquisition of second encoded video data, and controlling recording, in the recording medium, of the second encoded video data acquired under the control of the step of controlling the acquisition. The encoder performs first path encoding on the video data in accordance with first encoding conditions, the first path encoding being included in the encoding processing, and a different computer detects encoding types and data amounts of data items in the access units forming the resultant first encoded video data obtained by the first path encoding. By allocating, to each of the access units, a target amount of bits for the entirety of the second encoded video data, which is obtained when performing second path encoding on the video data on the basis of the detected encoding types and data amounts in the access units, the second path encoding being included in the encoding processing, the different computer sets target amounts of bits for the access units. The second encoded video data is obtained such that the encoder performs the second path encoding on the video data in accordance with second encoding conditions including at least the encoding types detected in the access units by the different computer and the target amounts of bits set in the access units by the different computer, and, when the second encoded video data is output from the encoder, the second encoded video data is acquired in the step of controlling the acquisition.

In the second information processing apparatus and method, second recording medium, second program according to the embodiments of the present invention, data, output from an encoder which performs encoding processing on each of data items in access units forming video data, is recorded in a predetermined recording medium. Specifically, the encoder performs first path encoding on the video data in accordance with first encoding conditions, the first path encoding being included in the encoding processing, and a different information processing apparatus or computer detects encoding types and data amounts of data items in the access units forming the resultant first encoded video data obtained by the first path encoding. By allocating, to each of the access units, a target amount of bits for the entirety of the second encoded video data, which is obtained when performing second path encoding on the video data on the basis of the detected encoding types and data amounts in the access units, the second path encoding being included in the encoding processing, the different information processing apparatus or computer sets target amounts of bits for the access units. The second encoded video data is obtained such that the encoder performs the second path encoding on the video data in accordance with second encoding conditions including at least the encoding types detected in the access units by the different computer and the target amounts of bits set in the access units by the different information processing apparatus or computer, and, when the second encoded video data is output from the encoder, the second encoded video data is acquired and recorded in the predetermined recording medium.

As described above, according to an embodiment of the present invention, encoded video data can be generated. In particular, encoded video data can be generated so that the capacity of a recording medium can be efficiently used up.

In addition, according to an embodiment of the present invention, encoded video data can be recorded in a recording medium so that the capacity of the recording medium can be efficiently used up. In other words, a recording medium having encoded video data recorded therein so that a recording capacity is efficiently used up.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

According to an embodiment of the present invention, a first information processing apparatus is provided. This first information processing apparatus (e.g., the video signal processor 24 shown in FIG. 7) controls an encoder (e.g., the encoder 53 shown in FIG. 7) that performs encoding on data items in access units forming video data (e.g., video data D1 played back by the video cassette recorder (VCR) 51 shown in FIG. 7) while switching encoding types. The first information processing apparatus includes a detecting means (e.g., the main controller 52 shown in FIG. 7 that executes the step S801 in FIG. 8) which controls the first path encoding on the video data in accordance with first encoding conditions and which detects, as information to be utilized in the second path encoding, which is to be performed on the video data, encoding types (e.g., the "picture type" described in the step S802 shown in FIG. 8) and data amounts (e.g., the "degree of difficulty" described in the step S802 shown in FIG. 8) for data items in the access units forming the resultant first encoded video data obtained by the first path encoding.

Figure 7:
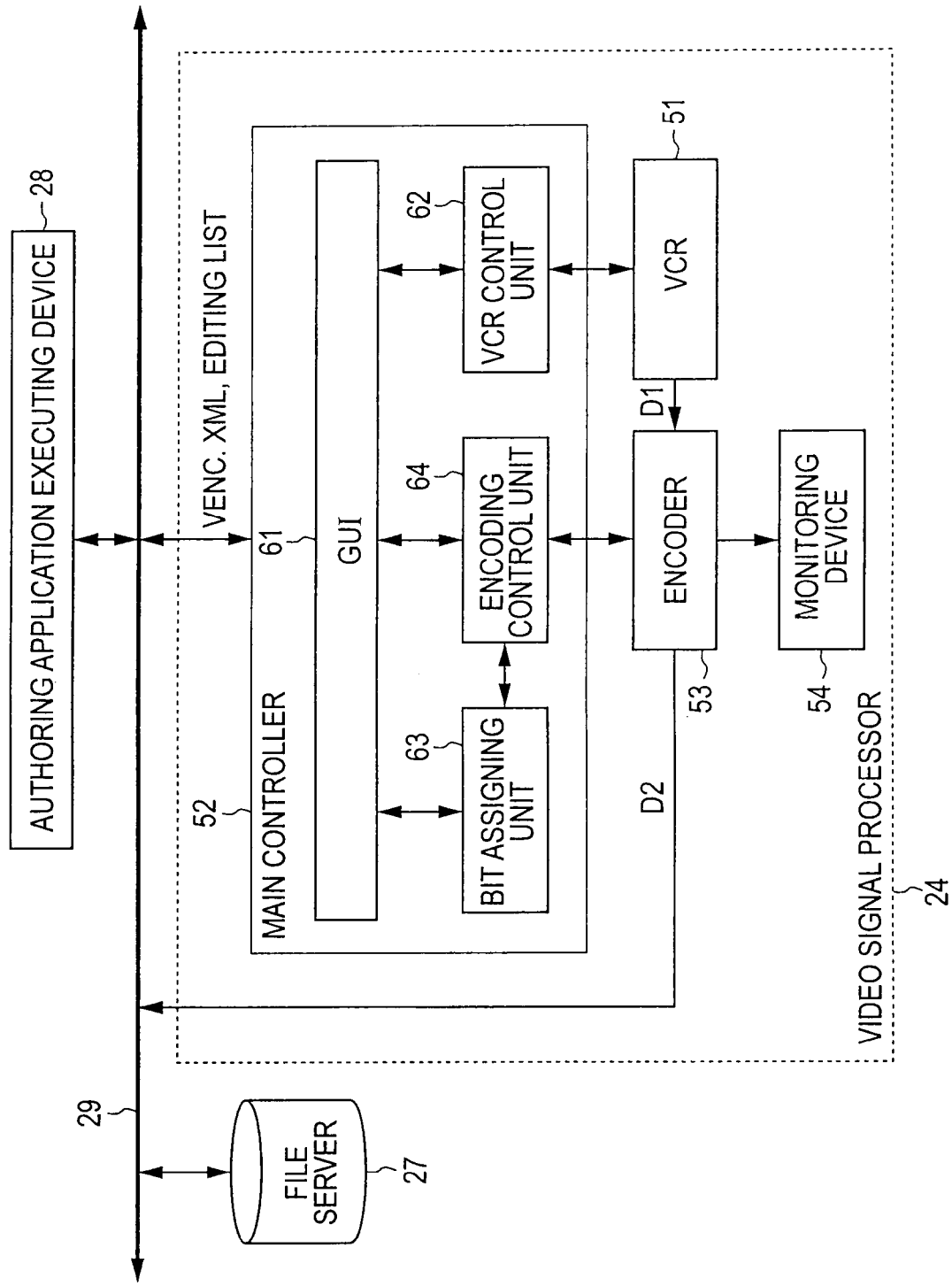
FIG. 7 is a block diagram showing an example of the configuration of a video signal processor in the studio-side authoring apparatus shown in FIG. 5.

The first information processing apparatus may further include a setting means (e.g., the main controller 52 shown in FIG. 7 that executes the step S803 shown in FIG. 8) that sets target amounts of bits for the access units by assigning, to each access unit, based on the encoding types and data amounts detected for the access units by the detecting means, a target amount of bits of the entirety of second encoded video data (e.g., encoded video data D2 output from the encoder 53 shown in FIG. 7) obtained when the video data is encoded by the second path encoding.

The first information processing apparatus may further include an encoding control means (e.g., the main controller 52 shown in FIG. 7 that executes the step S810 shown in FIG. 8) that controls implementation by the encoder of the two-path encoding on the video data in accordance with second encoding conditions including at least the encoding types detected for the access units by the detecting means and the target amounts of bits set for the access units by the setting means.

The first information processing apparatus may further includes a display control means (e.g., the main controller 52 shown in FIG. 7 for executing the step S805 shown in FIG. 8) which controls a predetermined display device (e.g., the monitoring device 54 shown in FIG. 7) to display, as preview video, video corresponding to the second encoded video data, the video being to be obtained when the second path encoding is performed on the video data in accordance with the second encoding conditions before the control by the encoding control means is initiated.

Figure 8:
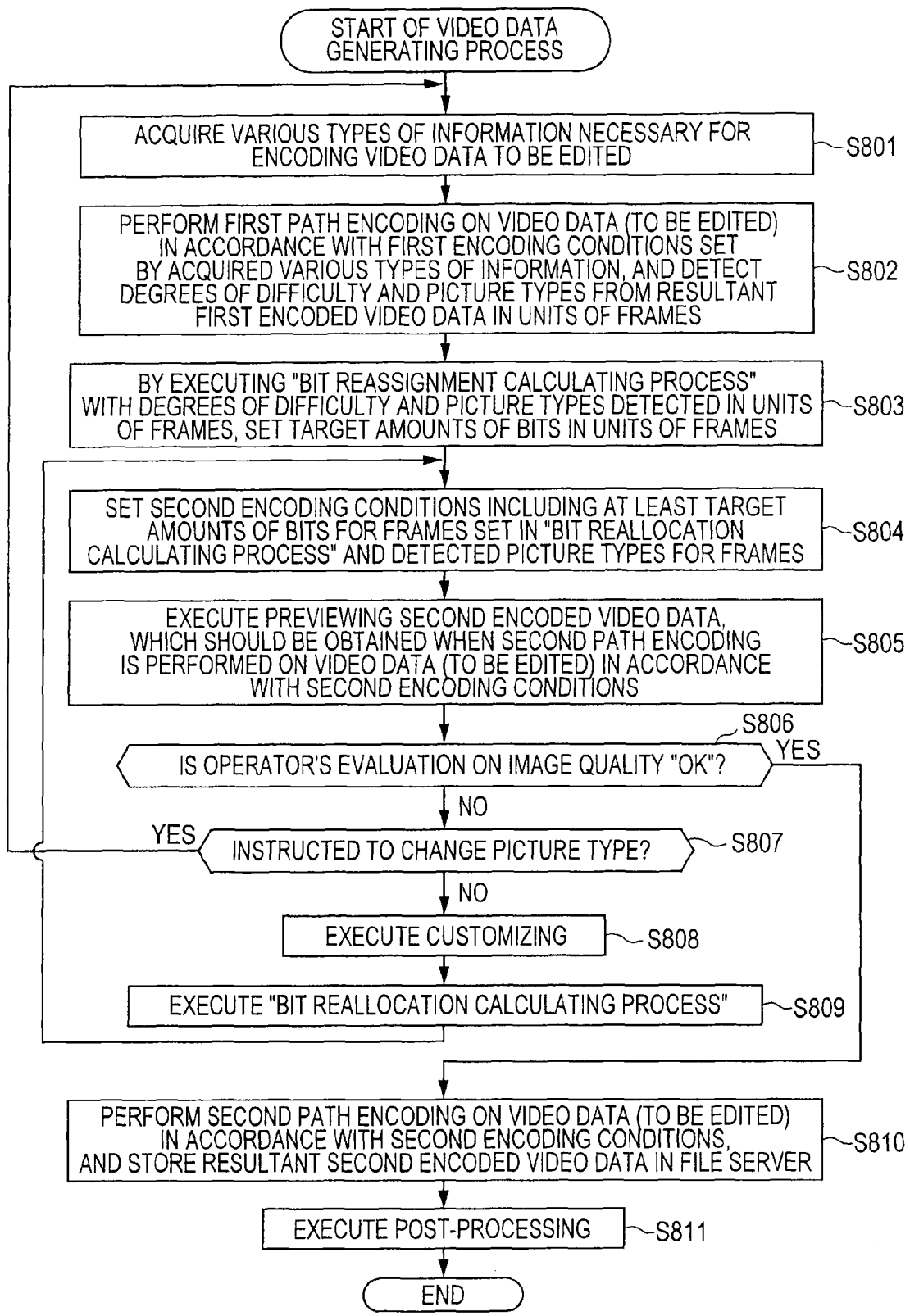
FIG. 8 is a flowchart illustrating an example of a "video data generating process" executed by the video signal processor shown in FIG. 7.

The first information processing apparatus may further include an input means (e.g., the GUI 62 in the main controller 52 shown in FIG. 7) which is operated by an operator viewing the preview video displayed on the display device under the control of the display control means, and which inputs, into the first information processing apparatus, information corresponding to an instruction of the operator, in which, when the input means inputs first information corresponding to an instruction to initiate the second path encoding (for example, if it is affirmatively determined in the step S806 shown in FIG. 8), the encoding control means initiates (for example, to initiate the step S810 shown in FIG. 8) control of the encoder to perform the second path encoding on the video data.

In the first information processing apparatus, when, before inputting the first information, the input means inputs second information corresponding to an instruction to alter at least part of the second encoding conditions (for example, if it is negatively determined in the step S806 shown in FIG. 8), at least one of the detecting means and the setting means may re-execute processing of the at least one of the detecting means and the setting means (for example, in FIG. 8, step S809 after step S808 is executed, or steps S801 to S803 are re-executed), the display control means may control the display device to display, as the preview video, the video corresponding to the second encoded video data, the video being to be obtained when the second path encoding is performed on the video data in accordance with the second encoding conditions in which said at least part of the second encoding conditions is altered such that the at least one of the detecting means and the setting means re-executes the processing of the at least one of the detecting means and the setting means (for example, the step S805 in FIG. 8 is re-executed), and, when the input means inputs the first information after the display control means performs the control (for example, if it is affirmatively determined in the step S806 shown in FIG. 8), the encoding control means may initiate (e.g., to initiate the step S810 shown in FIG. 8) control of the encoder to perform the second path encoding on the video data in accordance with the second encoding conditions in which said at least part of the second encoding conditions is altered such that the at least one of the detecting means and the setting means re-executes the processing of the at least one of the detecting means and the setting means.

According to an embodiment of the present invention, a first information processing method is provided. This first information processing method (e.g., a method corresponding to the "video data generating process" in FIG. 8) is an information processing method for the above-described first information processing apparatus. The first information processing method includes the (e.g., the step S802 shown in FIG. 8) step of controlling the encoder to perform first path encoding on the video data in accordance with predetermined encoding conditions, the first path encoding being included in the encoding processing, and detecting, as information for use in second path encoding being to be performed on the video data and being included in the encoding processing, encoding types and data amounts of data items in the access units forming the resultant first encoded video data obtained by controlling the encoder to perform the first path encoding.

According to an embodiment of the present invention, a first recording medium is provided. A program in the first recording medium (e.g., the removable recording medium 211 shown in FIG. 11, a hard disk included in the storage unit 208 shown in FIG. 11, or the like) is, for example, a program to be executed by the computer shown in FIG. 11, and corresponds to the above first information processing method.

In addition, according to an embodiment of the present invention, a first program corresponding to the program in the first recording medium is provided.

According to an embodiment of the present invention, a second information processing apparatus is provided. The second information processing apparatus (e.g., the plant-side authoring apparatus 101 shown in FIG. 9) records, in a predetermined recording medium (e.g., the optical disc mater 114 shown in FIG. 9), data (for example, this is directly the encoded video data D2 shown in FIG. 7 and is actually a multistream file generated by combining the data with other data. This multistream file is input as disc image data to the plant-side authoring apparatus 101 in the example in FIG. 9) output from an encoder (e.g., the encoder 53 shown in FIG. 7 in the video signal processor 24 in the studio-side authoring apparatus 11 shown in FIG. 5) which performs encoding processing on each of data items in access units forming video data while switching encoding types. The second information processing apparatus has the following features. The second information processing apparatus includes an acquiring means (e.g., the pre-mastering device 111 shown in FIG. 9) which second encoded video data, and a recording means (e.g., the cutting device 113 shown in FIG. 9) which records the second encoded video data acquired by the acquiring means in the recording medium. Specifically, the encoder performs first path encoding on the video data in accordance with first encoding conditions, the first path encoding being included in the encoding processing, and a different information processing apparatus (e.g., the video signal processor 24 shown in FIG. 7, particularly the main controller 52) detects encoding types and data amounts of data items in the access units forming the resultant first encoded video data obtained by the first path encoding. By allocating, to each of the access units, a target amount of bits for the entirety of the second encoded video data, which is obtained by performing second path encoding on the video data on the basis of the detected encoding types and data amounts in the access units, the second path encoding being included in the encoding processing, the different information processing apparatus sets target amounts of bits for the access units. The second encoded video data is obtained such that the encoder performs the second path encoding on the video data in accordance with second encoding conditions including at least the encoding types detected in the access units by the different information processing apparatus and the target amounts of bits set in the access units by the different information processing apparatus, and, when the second encoded video data is output from the encoder, the acquiring means acquires the second encoded video data.

According to an embodiment of the present invention, a second information processing method is provided. This second information processing method (e.g., a method corresponding to the process, shown in FIG. 10, of the plant-side authoring apparatus) is an information processing method for the above-described second information processing apparatus. Similarly to the case of describing the correspondence of the second information processing apparatus, the second information processing method includes the steps of acquiring (e.g., the step S1001 shown in FIG. 10) second encoded video data when it is output from an encoder, and recording (e.g., the step S1004 shown in FIG. 10), in a recording medium, the second encoded video data acquired in the step of acquiring the second encoded video data.

According to an embodiment of the present invention, a second recording medium is provided. A program in this second recording medium (e.g., the removable recording medium 211 shown in FIG. 11, a hard disk in the storage unit 208 in FIG. 11, or the like) is to be executed by, for example, the computer shown in FIG. 11, and corresponds to the above-described second information processing method.

In addition, according to an embodiment of the present invention, a first program corresponding to the program in the second recording medium is also provided.

As described above, in an embodiment of the present invention, various types of processing on video data are executed in access units. An access unit represents a moving picture (video) unit such as a frame or a field. Specifically, it represents, for example, all or part of frames (still images) forming video. In the following description, for brevity of description, various types of processing on video data are executed in units of frames.

Next, an embodiment of the present invention is described below.

Figure 1:
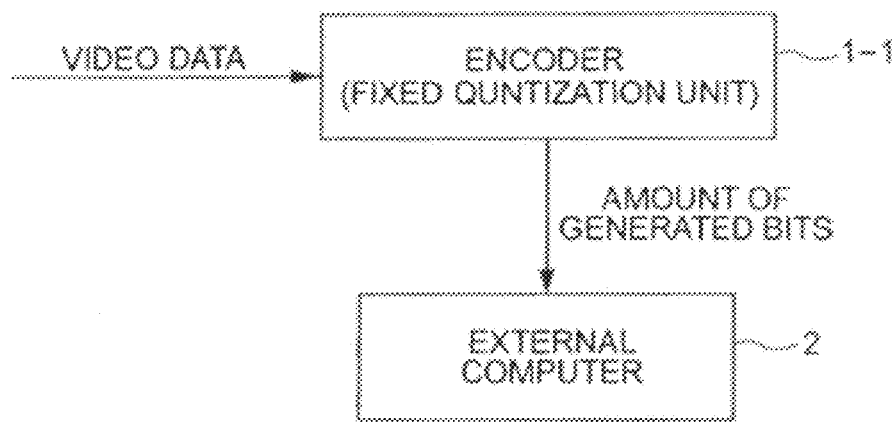
FIG. 1 is a block diagram showing an overview of two-path encoding of the related art.
Figure 2:
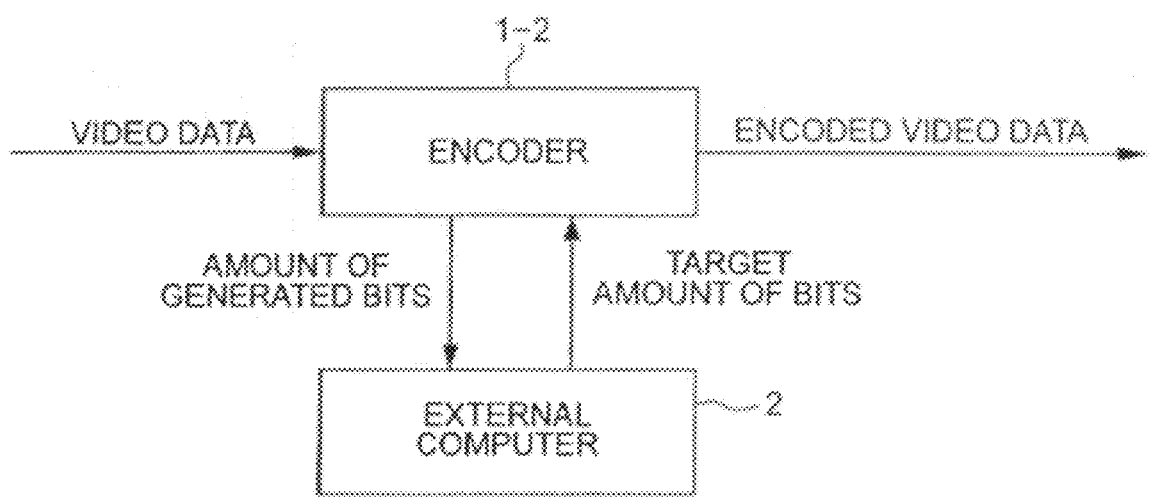
FIG. 2 is a block diagram showing an overview of two-path encoding of the related art.
Figure 3:
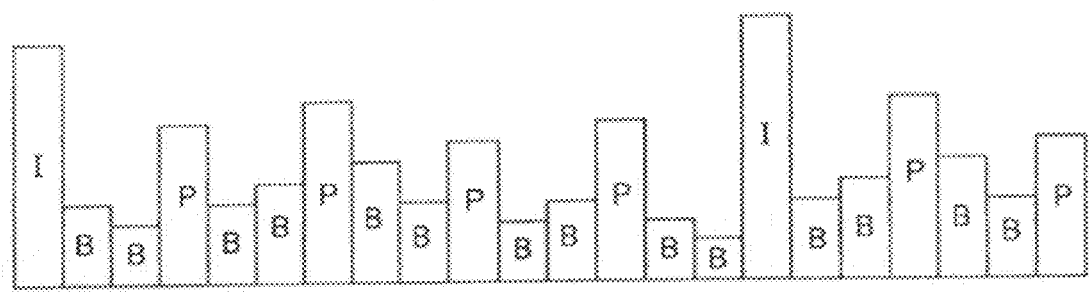
FIG. 3 is an illustration of examples of picture types in first path encoding in the two-path encoding of the related art.
Figure 4:
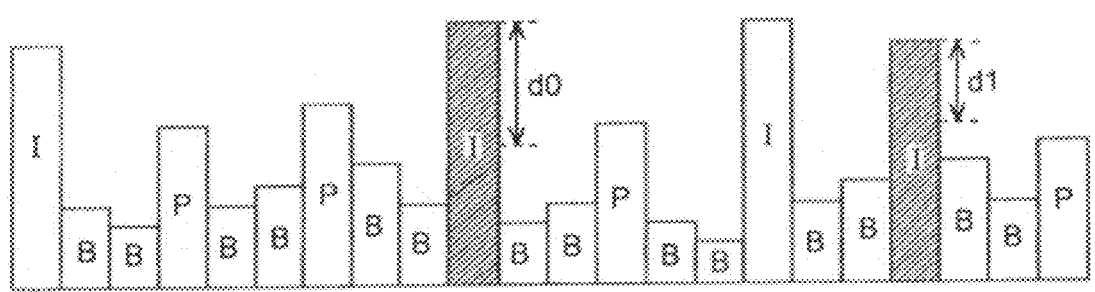
FIG. 4 is an illustration of examples of picture types in second path encoding in the two-path encoding of the related art.
Figure 5:
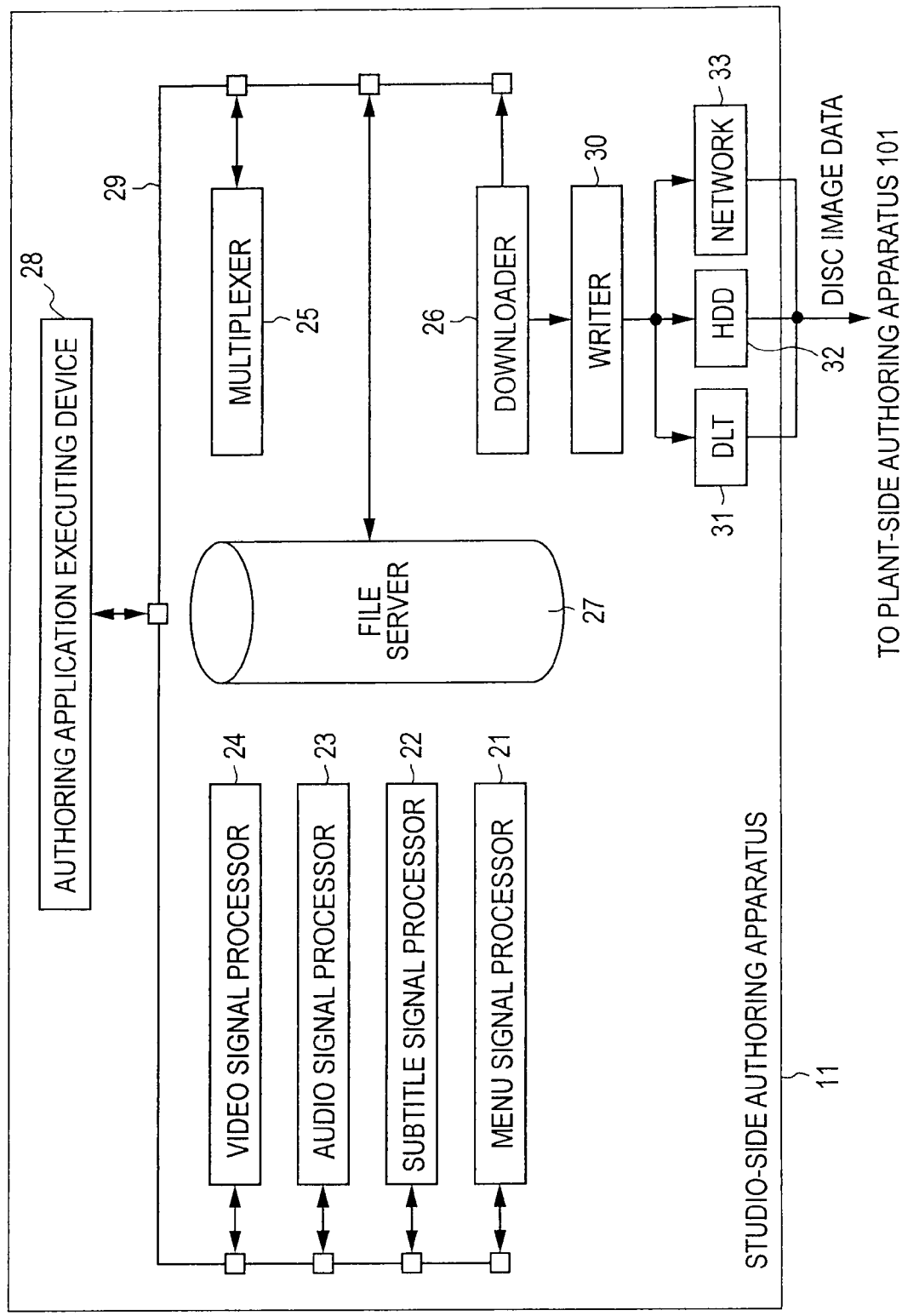
FIG. 5 is a block diagram showing an example of the configuration of a studio-side authoring apparatus according to an embodiment of the present invention.

FIG. 5 shows an example of an authoring apparatus 11 (hereinafter referred to as a "studio-side authoring apparatus"), installed on a studio side, according to an embodiment of the present invention.

The studio-side authoring apparatus 11 includes a menu signal processor 21, a subtitle signal processor 22, an audio signal processor 23, a video signal processor 24, and an authoring application executing device 28 which are connected to one another by a network 29, and a digital linear tape unit (DLT) 31, a hard disk drive (HDD) 32, and a network 33 which are connected to a downloader 26 through a writer 30.

The studio-side authoring apparatus 11 generates, as a file, a multistream which is to be recorded on an optical disc (not shown), and stores the multistream in at least one of the DLT 31, the HDD 32, and the network 33. To store data in the network 33 means transferring data through the network 33 to a different apparatus, connected to the network 33, for example, the plant-side authoring apparatus 101 (described later) shown in FIG. 9, and holding (storing) the data in the different apparatus.

Specifically, in the studio-side authoring apparatus 11, the menu signal processor 21 is controlled by the authoring application executing device 28 to switch operation, and performs encoding on video data which represents a menu screen and which is supplied from, for example, a videocassette recorder (VCR), and storing the resultant encoded video data in a file server 27.

The subtitle signal processor 22 is controlled by the authoring application executing device 28 to switch operation, and performs encoding on video data which represents subtitles or the like and which is supplied from, for example, the VCR (not shown), and storing the resultant encoded video data in the file server 27.

The audio signal processor 23 is controlled by the authoring application executing device 28 to switch operation, and performs encoding on audio data supplied from, for example, a tape recorder (not shown), and storing the resultant encoded audio data in the file server 27.

Under the control of the authoring application executing device 28, the video signal processor 24 performs encoding on video data that serves as main data in editing objects (data) to be recorded on the optical disc (not shown), and storing the resultant encoded video data in the file server 27.

A detailed configuration of the video signal processor 24 is described below with reference to FIG. 7.

Under the control of the authoring application executing device 28, the multiplexer 25 performs combining the encoded audio data and video data stored in the file server 27, and generating the resultant multistream as a file. This file is hereinafter referred to as the "multistream file".

The multistream file generated by the multiplexer 25 is supplied to the downloader 26 through the network 29. The downloader 26 stores the multistream file in at least one of the DLT 31, the HDD 32, and the network 33 through the writer 30.

The multistream file stored in at least one of the DLT 31, the HDD 32, and the network 33 is supplied to, for example, the plant-side authoring apparatus 101 (described later) shown in FIG. 9. The plant-side authoring apparatus 101 records the multistream file in, for example, an optical disc mater 114. In other words, the optical disc mater 114 having the multistream file recorded thereon is created by the plant-side authoring apparatus 101. More details of the plant-side authoring apparatus 101 are further described later.

The file server 27 includes, for example, a computer having a network management function and a fast access disk array. As described above, the file server 27 stores the encoded video data and audio data supplied from the menu signal processor 21 to the video signal processor 24 through the network 29. In response to a request of the multiplexer 25 or the like, the file server 27 outputs the stored encoded video data and audio data to the multiplexer 25 or the like through the network 29.

The authoring application executing device 28 includes, for example, a computer that can execute authoring application software. The authoring application software means software that controls the overall operation of the studio-side authoring apparatus 11. In other words, as described above, the authoring application executing device 28 controls the operation of each of the menu signal processor 21 to the downloader 26 in accordance with various conditions set by, for example, an operator.

Each of the menu signal processor 21 to the downloader 26 controlled by the authoring application executing device 28 is called an internal device in the studio-side authoring apparatus 11.

Figure 6:
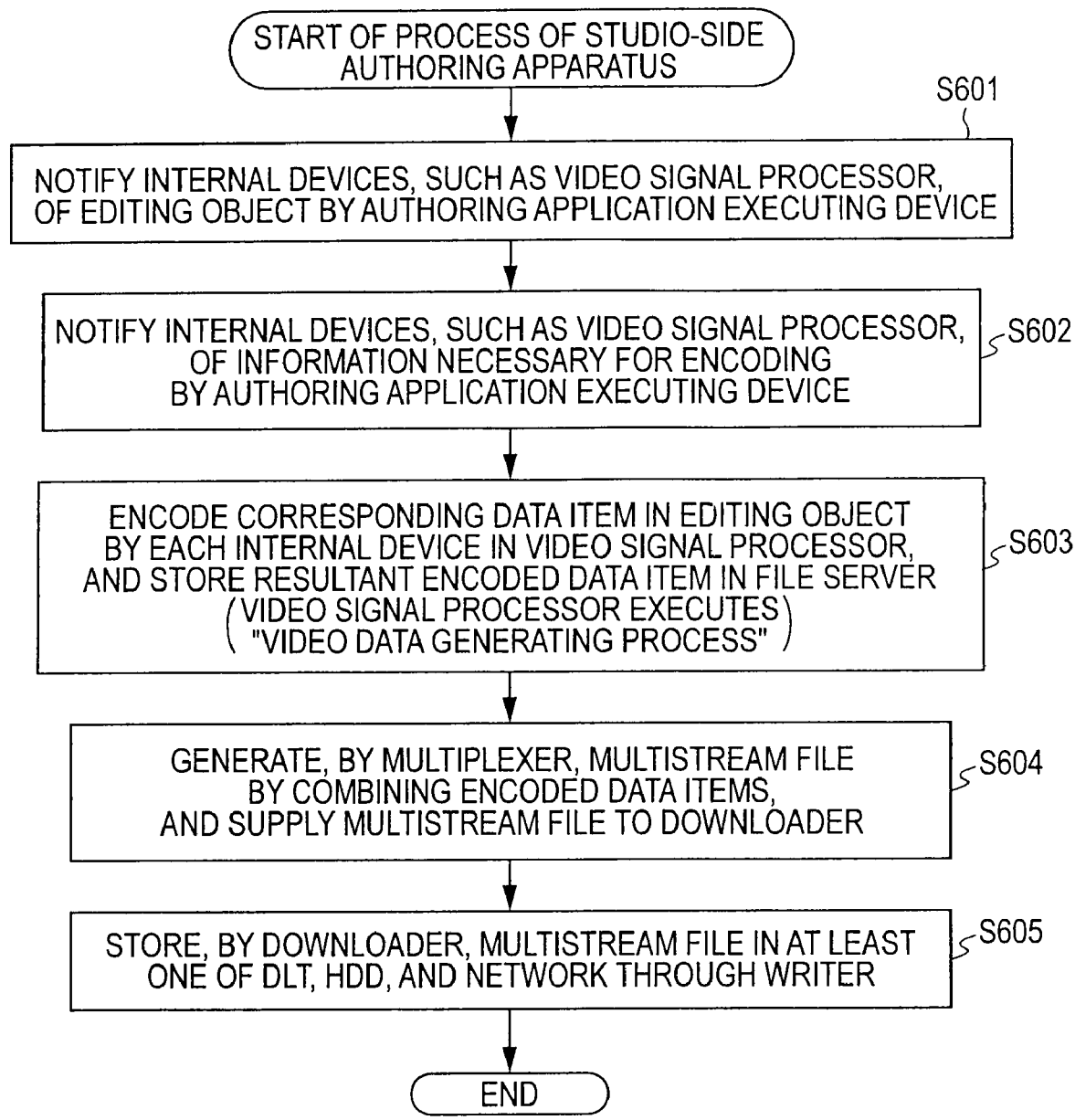
FIG. 6 is a flowchart illustrating an example of a process of the studio-side authoring apparatus shown in FIG. 5.

An example of a process of the studio-side authoring apparatus 11 is described below with reference to the flowchart shown in FIG. 6.

In step S601, by notifying the internal devices, such as the video signal processor 24, of an editing list in accordance with an operator's operation, the authoring application executing device 28 notifies the internal devices, such as the video signal processor 24, of an editing object.

The editing object means so-called material (data) which includes, for example, at least video data to be processed by the video signal processor 24, and which also includes, if necessary, an arbitrary number and arbitrary types of data items among audio data to be processed by the audio signal processor 23, video data to be processed by the subtitle signal processor 22, and video data to be processed by the menu signal processor 21.

In step S602, the authoring application executing device 28 notifies the internal devices, such as the video signal processor 24, of various types of information necessary for encoding.

In this case, in step S602, the various types of information are all included in a predetermined file, and the internal devices are notified of this file. This file is hereinafter referred to as the "encoded file".

Figure 9:
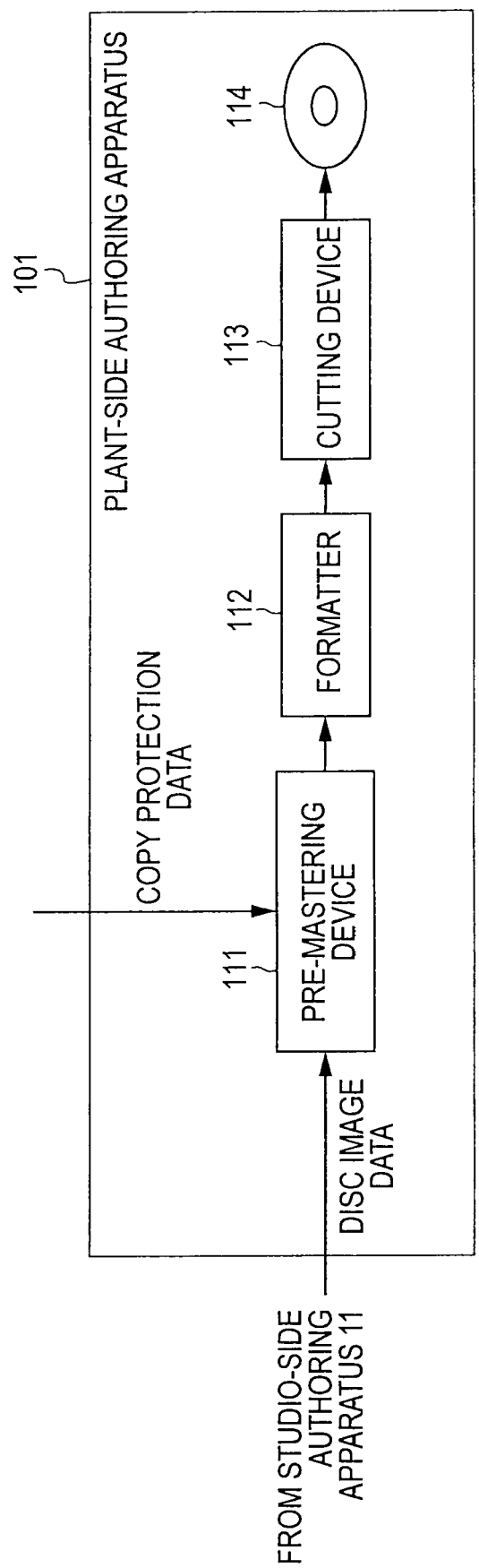
FIG. 9 is a block diagram showing an example of a plant-side authoring apparatus according to an embodiment of the present invention.

Specifically, for example, in step S602, the authoring application executing device 28 acquires the amount of data that can be recorded on an optical disc, such as the optical disc mater 114 shown in FIG. 9, on which the editing object is to be recorded. Next, based on the data amount, the authoring application executing device 28 calculates data amounts to be assigned to data items forming the editing object. The authoring application executing device 28 includes the calculated data amounts in the encoded file, and notifies a corresponding internal device, among the internal devices, of the encoded file. For example, the authoring application executing device 28 includes, in the encoded file, the video data to be processed by the video signal processor 24, that is, a data amount (hereinafter referred to as a "data amount assignable to video data") to be assigned to video data in the editing object excluding a menu and titles, and notifies the video signal processor 24 of the encoded file.

In addition, for example, in step S602, the authoring application executing device 28 includes, in the encoded file, chapter time information (hereinafter referred to as an "access chapter point"), set by the operator, concerning the video data in the editing object excluding the menu and titles, and notifies the video signal processor 24 of the encoded file. A chapter represents a frame to which intraframe encoding (I picture) is forcibly assigned. An apparatus that can handle the optical disc mater 114 in FIG. 9, or the like, can jump over tracks to the chapter as a target for confirming recorded content.

In addition, for example, in step S602, the authoring application executing device 28 includes, in the encoded file, a maximum number of display fields (e.g., 15 frames) in groups of pictures (GOPs) and encoding arrangement in each GOP, and notifies the video signal processor 24 of the encoded file.

In addition, for example, in step S602, the authoring application executing device 28 also includes a multi-angle processing object in the encoded file, if necessary, and notifies the video signal processor 24 of the encoded file. Multi-angle processing means processing in which, by recording a plurality of video materials on an optical disc in time-divisionally multiplex form, a scene, such as a running train scene, can be viewed from different shooting positions in response to user's preferences.

In addition, for example, in step S602, the authoring application executing device 28 also includes, in the encoded file, information of automatic scene-change detection (ON/OFF), an optical disc capacity, start time and end time of video recording, etc., and notifies the video signal processor 24 of the encoded file.

After the encoded file including various types of information necessary for encoding is supplied to each internal device, the process proceeds to step S603.

In step S603, based on the various types of information included in the encoded file, each internal device in the video signal processor 24 encodes a corresponding data item in the editing object, and stores the resultant encoded data item in the file server 27.

Specifically, for example, in step S603, the video signal processor 24 executes the video data generating process shown in FIG. 8. Details of the video data generating process are described later.

In step S604, the multiplexer 25 generates a multistream file by combining the encoded data items stored in the file server 27 in step S603, and supplies the multistream file to the downloader 26.

In step S605, the downloader 26 uses the writer 30 to store the multistream file in at least one of the DLT 31, the HDD 32, and the network 33.

This finishes the process of the studio-side authoring apparatus 11.

After describing the example of the configuration of the studio-side authoring apparatus 11 with reference to FIG. 5, the example of the process of the studio-side authoring apparatus 11 has been described with reference to FIG. 6.

Next, an example of the detailed configuration of the video signal processor 24 in the studio-side authoring apparatus 11 is described below with reference to FIG. 7.

As shown in FIG. 7, the video signal processor 24 includes, for example, a VCR 51, a main controller 52, and a monitoring device 54.

As described above, in step S601 in FIG. 6, the editing list is supplied from the authoring application executing device 28 to the video signal processor 24. Specifically, as shown in FIG. 7, the editing list is supplied to the main controller 52, and is subsequently supplied to the VCR 51. In other words, the editing list is supplied to the VCR 51 through the main controller 52.

By playing back a magnetic tape (not shown) in accordance with the editing list, video data D1 to be processed is output and supplied to an encoder 53 by the VCR 51.

The encoder 53 switches operation in accordance with various encoding conditions set by the main controller 52, and performs encoding on the video data D1 output from the VCR 51 by using, for example, an MPEG technique. At this time, the set various encoding conditions are variably controlled by the main controller 52, whereby the amount of generated bits from the encoder 53 can be controlled.

The encoder 53 notifies the main controller 52 of the result of the encoding. This allows the main controller 52 to detect, in units of frames, picture types used in the encoding by the encoder 53 and the amount of bits generated in the encoding.

In addition, when the two-path encoding to which an embodiment of the present invention is applied is performed, the encoder 53 also executes encoding both the first and second paths.

Specifically, for example, in order to preset encoding conditions for use in second path encoding, the encoder 53 executes first path encoding, for example, encoding that is part of processing in the step S802 (described later) shown in FIG. 8. Specifically, the encoder 53 uses its internal processing to assign picture types. The encoder 53 uses the assigned picture types to perform first path encoding on the video data D1, and notifies the main controller 52 of the result of the first path encoding, for example, picture types for frames, the amount of generated bits, etc.

For the second path encoding, for example, encoding in step S810 (described later) shown in FIG. 8, the encoder 53 executes the following processing. In other words, by using the picture types and target amounts of bits set in units of frames by the main controller 52, the encoder 53 performs the second encoding on the video data D1, and stores the resultant encoded video data D2 in the file server 27 via the network 29. In this case, the encoder 53 notifies the main controller 52 of the amount of the video data D2 stored in the file server 27, etc.

In the two-path encoding according to an embodiment of the present invention, points other than the first path encoding and second path encoding by the encoder 53 are described later with reference to FIG. 8.

A monitoring device 54 includes, for example, a display device, and displays video corresponding to the encoded video data D2 output from the encoder 53 under the control of the main controller 52 through the encoder 53. In other words, the encoder 53 re-decodes the encoded video data D2, and supplies the resultant video signal to the monitoring device 54. The monitoring device 54 displays video, corresponding to the supplied video signal, that is, the encoded video data D2.

This enables the operator to confirm the result of processing in the encoder 53 through the monitoring device 54, if necessary. In other words, the video signal processor 24 uses the monitoring device 54 to enable a preview of the result of processing in the encoder 53. In addition, by operating the main controller 52 based on the preview, the operator can fine alter each of the various encoding conditions.

The main controller 52 includes, for example, a computer assigned by the video signal processor 24. The main controller 52 controls the overall operation of the video signal processor 24 by performing data communication with the authoring application executing device 28 via the network 29.

Accordingly, as shown in FIG. 7, the main controller 52 includes, for example, a graphical user interface (GUI) 61, a VCR control unit 62, a bit assigning unit 63, and an encoding control unit 64.

In other words, the main controller 52 uses management by the GUI 61 to accept the control of the authoring application executing device 28 and an operator's operation, and also controls the operation of each of the VCR 51, the encoder 53, and the monitoring device 54 by using the VCR control unit 62, bit assigning unit 63, and encoding control unit 64 controlled by the GUI 61.

This enables the main controller 52 to set the various encoding conditions, for example, based on the encoded file sent from the authoring application executing device 28. To distinguish from encoded files supplied to other internal devices, the encoded file supplied to the video signal processor 24 is hereinafter referred to as "encoded file VENC.XML", as indicated in FIG. 7.

As described above, the main controller 52 uses the GUI 61 to receive the operator's setting. This can update, for example, setting of the various encoding conditions.

The main controller main controller 52 controls implementation of encoding on video data D1 (to be processed) in accordance with the above-set or updated various encoding conditions.

In addition, the main controller 52 can receive the result of encoding sent from the encoder 53, and can notify the authoring application executing device 28 of the received result of encoding.

Specifically, by controlling the operation of the VCR 51 in accordance with the editing list sent from the authoring application executing device 28, the VCR control unit 62 plays back video data D1 in the VCR 51.

The bit assigning unit 63 sets the various encoding conditions in accordance with the encoded file VENC.XML sent from the authoring application executing device 28, and notifies the encoding control unit 64 of control data corresponding to the encoding conditions. At this time, the bit assigning unit 63 can alter the various encoding conditions in response to an operator's operation on the GUI 61.

The encoding conditions set by the bit assigning unit 63 correspond to, for example, when two-path encoding according to an embodiment of the present invention, which is described later with reference to FIG. 8, is executed, the first encoding conditions for use in the first path encoding and the second encoding conditions for use in the second path encoding. The first encoding conditions include, for example, various conditions necessary for setting picture types in internal processing of the encoder 53 when it executes the first path encoding. The second encoding conditions include, for example, picture types and target amounts of bits in frames used in the second path encoding.

The VCR control unit 62 executes the following processing, for example, when the two-path encoding (described later with reference to FIG. 8) in the embodiment of the present invention is executed.

In other words, the encoding control unit 64 controls the first path encoding and second path encoding of the encoder 53 in accordance with a control file sent from the bit assigning unit 63.

In addition, the encoding control unit 64 detects the degrees of difficulty necessary for encoding and picture types in units of frames from the result of the first path encoding by the encoder 53, and notifies the bit assigning unit 63 of the result of detection. By using the degrees of difficulty and picture types in units of frames from the encoding control unit 64, the bit assigning unit 63 sets the second encoding conditions for use in the second path encoding. The degrees of difficulty are described later.

The encoding control unit 64 controls storing, in the file server 27 via the network 29, of the encoded video data D2 obtained such that the encoder 53 finally performs the second path encoding.

The example of the detailed configuration of the video signal processor 24 has been described with reference to FIG. 7. Next, an example of the two-path encoding (according to an embodiment of the present invention) which is executed by the video signal processor 24 is described below. In other words, the video data generating process shown in FIG. 8 is an example of the two-path encoding according to an embodiment of the present invention.

When the video signal processor 24 is instructed by the authoring application executing device 28 to start the video data generating process after being notified of the editing list (editing object) in step S601 (FIG. 6) and encoded file VENC.XML is supplied in step S602 (FIG. 6), the VCR control unit 62, bit assigning unit 63, and encoding control unit 64 of the video signal processor 24 are activated under the management of the GUI 61, whereby the video data generating process is started. In other words, the process proceeds to step S603 in FIG. 6, and the video data generating process is started as processing of the video signal processor 24 in processing in step S603.

In step s801, from the encoded file VENC.XML supplied from the authoring application executing device 28, the main controller 52 acquires various types of information necessary for encoding video data D1 to be edited.

Specifically, in step S801, among the various types of information included in encoded file VENC.XML, pieces of information, such as an access (chapter) point, information of automatic scene-change detection (ON/OFF), an optical disc capacity, start time and end time of video recording, and a data amount assignable to video data D1, are acquired.

In step S802, by controlling the VCR 51 and the encoder 53, the main controller 52 performs the first path encoding on video data D1 (to be edited) in accordance with the first encoding conditions set based on the various types of information acquired in step S801, and detects the degrees of difficulty (necessary for encoding) and picture types in units of frames from the resultant first encoded video data.

Specifically, for example, the following processing is executed as step S802.

In other words, the VCR 51 plays back video data D1 to be edited, and outputs the played-back data to the encoder 53.

The encoder 53 sets picture types in the frames forming the video data D1. In other words, in the encoder 53, a frame designated based on an instruction from the main controller 52 is set to an I picture. In addition, when the automatic scene-change detection information acquired in step S801 is set to ON (when the encoder 53 is notified of the fact), in the encoder 53, a frame determined to have a scene change from correlation between adjacent frames is forcibly set to an I picture. The encoder 53 executes processing in which a group of frames from the frame set to the I picture to a frame immediately before the next I picture is set as a close GOP.

The encoder 53 uses the thus set picture types to sequentially perform the first path encoding on the frames forming video data D1 by performing a fixed quantization step. The encoder 53 notifies the main controller 52 of the amounts of bits generated that time, that is, the amounts of bits generated when the frames are encoded, and notifies the main controller 52 of the picture types in the frames.

The notification from the encoder 53 allows the main controller 52 to detect the degrees of difficulty and picture types in units of frames. In other words, in the main controller 52, the picture type in each frame sent from the encoder 53 is detected as the picture type in each frame. The main controller 52 detects (measures) the amounts of bits generated in the frames (from the encoder 53) as the degrees of difficulty in the frames.

As described above, the degree of difficulty in this specification represents a data amount in each frame obtained by performing fixed-quantization-step encoding on video data D1.

In other words, in interframe encoding (whose encoding type is a P or B picture), a portion having a large movement has a large prediction error (difference) from a predictive frame. Accordingly, for the error, more data is needed in order to suppress deterioration in image quality. In intraframe encoding (whose encoding type is an I picture), when there are many high frequency components, discrete cosine transformation generates higher degree coefficient data. Accordingly, for that, a more amount of data is needed in order to suppress deterioration in image quality. Therefore, when fixed-quantization-step encoding on video data D1 is performed, a portion (frame) in which the more amount of data is needed in order to suppress deterioration in image quality, a more amount of data is detected. From the foregoing, each data amount in each frame forming encoded video data obtained by performing fixed-quantization-step encoding on video data D1 (to be edited), itself, represents the degree of difficulty in the frame.

After the above consecutive processing in step S802 finishes, the process proceeds to step S803.

In step S803, by executing a bit allocation calculating process by using the degrees of difficulty and picture types detected in units of frames in step S802, the main controller 52 sets target amounts of bits in units of frames.

The bit allocation calculating process is, for example, the following process. In other words, computation in which, by using the degrees of difficulty and picture types detected in step S802, a target bit amount of the entirety of encoded video data D2 obtained by performing the second path encoding on the video data D1 (to be edited) is assigned to each frame is the bit allocation calculating process.

The bit allocation calculating process is further described below.

Specifically, the main controller 52 calculates a total amount, represented by TOTAL_SUPPLY, of bits capable of being actually assigned to video data D1 (encoded video data D2) by executing the following calculation:

$$TOTAL\_SUPPLY = TOTAL\_BYTES\_TOTAL\_HEADER \quad (1)$$

where TOTAL_BYTES represents the data amount (acquired in step S801) of data capable of being assigned to video data D1, and corresponds to the target data amount of the entirety of the encoded video data D2 which is recorded in the file server 27 on the network 29, and TOTAL_HEADER represents the amount of additional data such as a header in encoded video data D2 and is a data amount specified by the total number of GOPs.

Accordingly, by performing the calculation in expression (1), the main controller 52 calculates, as the total amount TOTAL_SUPPLY of bits capable of being actually assigned to video data D1, a data amount capable of being assigned to a data part obtained by subtracting additional data from encoded video data D2.

Next, the main controller 52 assigns, to each encoding unit, the total amount TOTAL_SUPPLY of bits capable of being actually assigned to video data D1. The thus assigned data amount in each encoding unit is hereinafter referred to as a "target bit amount" of corresponding encoding unit, and is represented by SUPPLY_BYTES.

For each encoding unit, the main controller 52 calculates the sum of the degrees of difficulty (the degrees of difficulty detected in step S802) in frames belonging to a corresponding encoding unit. The degree of difficulty in each frame is represented by DIF, and the sum of the degrees DIFs of difficulty is represented by DIF_SUM.

Next, the main controller 52 performs calculation using an evaluation function for allocating bits in units of GOPs for each encoding unit. The evaluation function is represented by, for example, the following expression:

$$Y = BX \quad (2)$$

where Y represents a target bit amount SUPPLY_BYTES of an encoding unit which is subject to calculation, and X presents the sum DIF_SUM of the degrees DIFs of difficulty in frames belonging to the encoding unit which is subject to calculation.

After the main controller 52 sets the evaluation function in expression (2), as described above, in other words, after coefficient B in the evaluation function in expression (2) is calculated, for each of encoding units, the calculation in the following expression (3) using coefficient B is sequentially performed.

$$GOP\_TGT = B \times GOP\_DIF\_SUM \quad (3)$$

where GOP_DIF_SUM represents the sum of the degrees DIFs of difficulty in frames belonging to a GOP which is subject to calculation, and GOP_TGT represents a target bit amount of the GOP which is subject to calculation.

In other words, the target bit amount GOP_TGT of the GOP (which is subject to calculation) represents the amount of data that is allocated to the GOP (which is subject to calculation) in accordance with the degree GOP_DIF_SUM of the GOP (which is subject to calculation) from the target bit amount SUPPLY_BYTES of an encoding unit including the GOP which is subject to calculation.

By executing allocating the target bit amount GOP_TGT of a targeted GOP to each of frames belonging to the targeted GOP, the main controller 52 sets target amounts of bits in the frames.

The above consecutive processing is the bit allocation calculating process.

As described above, in the bit allocation calculating process in step S803, based on the result of performing the first path encoding (the result of step S802), one of the second encoding conditions for use in the second path encoding, that is, target amounts of bits, are set.

After the above step S803 finishes, the process proceeds to step S804.

In step S804, the main controller 52 sets the second encoding conditions, which include the target amounts of bits in frames which are set in the preceding bit allocation calculating process (step S803 in this case), and the picture types in frames detected in preceding step S802.

In step S805, the main controller 52 executes previewing the second encoded video data D2, which should be obtained when the second path encoding is performed on the video data D1 (to be edited) in accordance with the second encoding conditions.

The previewing in step S805 represents, for example, the following consecutive processing. Specifically, as described above, in response to an operator's operation on the GUI 61, that is, in response to the control of the main controller 52, the VCR 51 plays back the video data D1 to be edited, and supplies the played-back data to the encoder 53. The encoder 53 temporarily encodes the video data D1 in accordance with the second encoding conditions, re-decodes the resultant encoded video data D2 without outputting the video data D2, and supplies the resultant video signal to the monitoring device 54. The monitoring device 54 displays video corresponding to the video signal. In other words, the monitoring device 54 displays, as preview video, video corresponding to the second encoded video data D2, which should be obtained when the second path encoding is performed on the video data D1 (to be edited) in accordance with the second encoding conditions. The above consecutive processing is the previewing in step S805.

In step S806, the main controller 52 determines whether operator's evaluation on image quality is acceptable ("OK").

Specifically, the operator can evaluate preview video, displayed on the monitoring device 54, that is, the quality of video corresponding to the encoded video data D2, and can input the result of the evaluation to the main controller 52 by operating the GUI 61.

For example, when the operator satisfies the quality and operates the GUI 61 to instruct the video signal processor 24 to start the second path encoding, in step S806, it is determined that the quality evaluation is acceptable ("OK"), and the process proceeds to step S810.

In step S810, the main controller 52 controls the VCR 51 and the encoder 53 to perform the second path encoding on the video data D1 (to be edited) in accordance with the second encoding conditions set in step S804, and stores the resultant second encoded video data D2 in the file server 27.

Specifically, for example, under the control of the main controller 52, the VCR 51 plays back the video data D1 (to be edited) and supplies the played-back data to the encoder 53. The main controller 52 performs the second path encoding on the video data D1 in accordance with the second encoding conditions specified by the main controller 52, and stores the resultant second encoded video data D2 in the file server 27 via the network 29 under the control of the main controller 52.

After that, in step S811, the main controller 52 executes post-processing such as notifying the authoring application executing device 28 of the result of the second path encoding. This finishes the video data generating process.

Conversely, since the operator does not satisfy the preview video, displayed on the monitoring device 54, that is, the quality of the video corresponding to encoded video data D2 in a state before it is stored in the file server 27, when the operator operates the GUI 61 to select customizing, in step S806, it is determined that the operator's evaluation on image quality is not acceptable ("OK"), the process proceeds to step S807.

In step S807, the main controller 52 determines whether the video signal processor 24 has been instructed to change the picture type.

In other words, by operating the GUI 61, the operator can input, into the main controller 52, an instruction to change each picture type of one or more frames among the frames forming the video data D1 (to be edited) from a B or P picture to an I picture.

If the operator does not issue such an instruction, in step S807, it is determined that the video signal processor 24 has not been instructed to change the picture type. The process proceeds to step S808.

In step S808, the main controller 52 executes customizing. The customizing represents processing that, in response to an operator's operation on the GUI 61, performs partial image quality change by partially altering the encoding conditions.

In step S809, similarly to step S803, the main controller 52 updates the set target amounts of bits by re-executing the bit allocation calculating process. In other words, step S809 is basically similar to the above step S803. However, step S809 differs from step S803 in that the result of the customizing in the preceding step S808 is utilized.

After step S809 finishes, the process returns to step S804 and the subsequent steps are repeatedly performed.

If the video signal processor 24 has been instructed by the operator to change the picture type, in step S807, it is determined that the video signal processor 24 has been instructed to change the picture type. The process returns to step S801, and the subsequent steps are repeatedly performed.

In other words, a frame in which change of a picture type is ordered by the operator is regarded as a scene change point. As a result, consecutive processing after the above-described step S801 for acquiring the various types of information is performed again.

After describing the example of the detailed configuration of the video signal processor 24 with reference to FIG. 7, the video data generating process of the video signal processor 24, that is, an example of the two-path encoding according to an embodiment of the present invention, has been described with reference to FIG. 8.

As described above, based on the degree of difficulty and picture type in each frame, the video signal processor 24 can set the second encoding conditions for use in the second path encoding. The video signal processor 24 can alter the second encoding conditions in response to an operator's operation. Accordingly, the video data D1 is encoded based on the second encoding conditions, which finally satisfy the operator, and the resultant encoded video data D2 is stored in the file server 27.

In addition, the degree of difficulty and picture type, which serve as a basis for the set second encoding conditions, are obtained by performing the first path encoding. Unlike the related art, in an embodiment of the present invention, picture types for use in the first path encoding and the second path encoding are identical for all the frames. In other words, in an embodiment of the present invention, it may be said that the condition "a picture type used in the first path encoding is directly used also in the second path encoding" is included in the second encoding conditions. Therefore, problems that occur in the technique in Japanese Unexamined Patent Application Publication No. 11-004445 do not occur in an embodiment of the present invention. Accordingly, in an embodiment of the present invention, encoded video data D2 can be generated so that the recording capacity of a recording medium for the encoded video data can be efficiently used up. In other words, the above-described problems in the related art can be solved.

After that, as described above, in the studio-side authoring apparatus 11 in FIG. 5, the encoded video data D2, and other encoded video data and encoded audio data are combined to generate a multistream file, and the multistream file is stored in at least one of the DLT 31, the HDD 32, and the network 33.

As described above, the multistream file stored in at least one of the DLT 31, the HDD 32, and the network 33 is supplied as disc image data to, for example, the authoring apparatus (hereinafter referred to as the "plant-side authoring apparatus") 101, shown in FIG. 9, installed on a plant side.

In other words, FIG. 9 shows an example of the configuration of a plant-side authoring apparatus according to an embodiment of the present invention.

As shown in FIG. 9, the plant-side authoring apparatus 101 includes, for example, a pre-mastering device 111, a formatter 112, and a cutting device 113.

Figure 10:
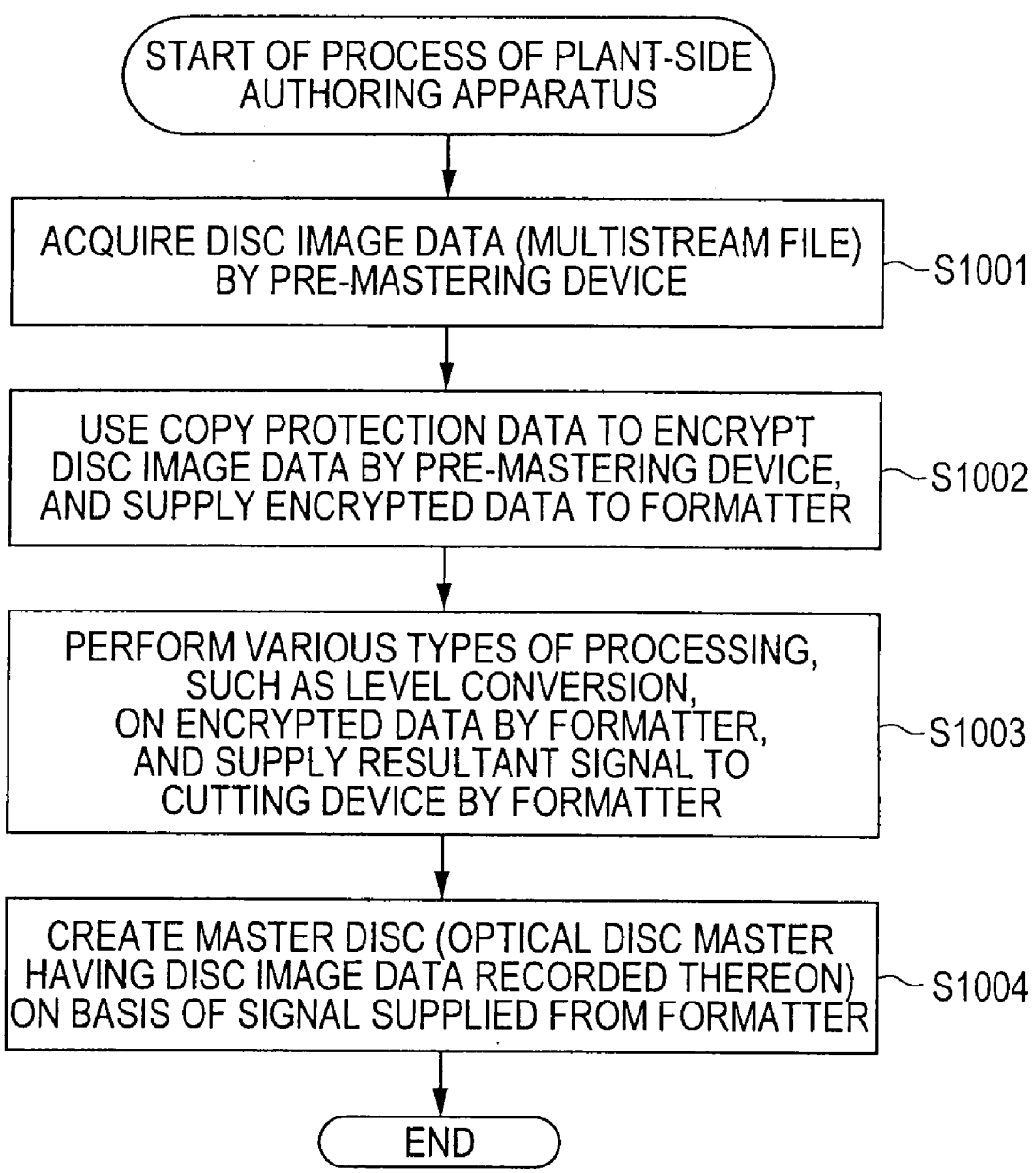
FIG. 10 is a flowchart illustrating an example of the plant-side authoring apparatus shown in FIG. 9.

An example of a process of the plant-side authoring apparatus 101 is described below with reference to the flowchart shown in FIG. 10.

In step S1001, the pre-mastering device 111 acquires disc image data (multistream file including the encoded video data D2 shown in FIG. 7).

In step S1002, the pre-mastering device 111 encrypts the disc image data by using externally supplied copy protection data, and supplies the resultant encrypted data to the formatter 112.

In step S1003, the formatter 112 performs various types of processing, such as signal level conversion, on the encrypted data, and supplies the resultant signal to the cutting device 113.

In step S1004, based on the signal supplied from the formatter 112, the cutting device 113 creates the optical disc mater 114 (optical disc master having the disc image data recorded thereon).

This finishes the process of the plant-side authoring apparatus 101.

As described above, in the first path encoding on the video data D1 in FIG. 7, a picture type optimized for video material is set and used, and, based on the picture type, a target amount of bits for each frame is set. After that, by using the picture type, which is identical to that in the first path, and the target amount of bits set in the first path, the second path encoding is performed on the video data D1, and the resultant encoded video data D2 is obtained. The disc image data including the encoded video data D2 is supplied to the plant-side authoring apparatus 101, and is recorded on the optical disc mater 114.

Therefore, by notifying beforehand the studio-side authoring apparatus 11 (in FIG. 5) of a usable disc capacity of the optical disc mater 114, the video signal processor 24 in FIG. 7 can set target amounts of bits which match the notification. Accordingly, this can prevent the amount of the disc image data recorded on the optical disc mater 114 from becoming insufficient or excessive than the usable disc capacity of the optical disc mater 114. This makes it possible to use up the capacity of the optical disc mater 114 to a maximum extent, so that image quality of video data recorded on the optical disc mater 114 can be improved.

Although the above consecutive processing can be executed by hardware, it can be executed by software.

Figure 11:
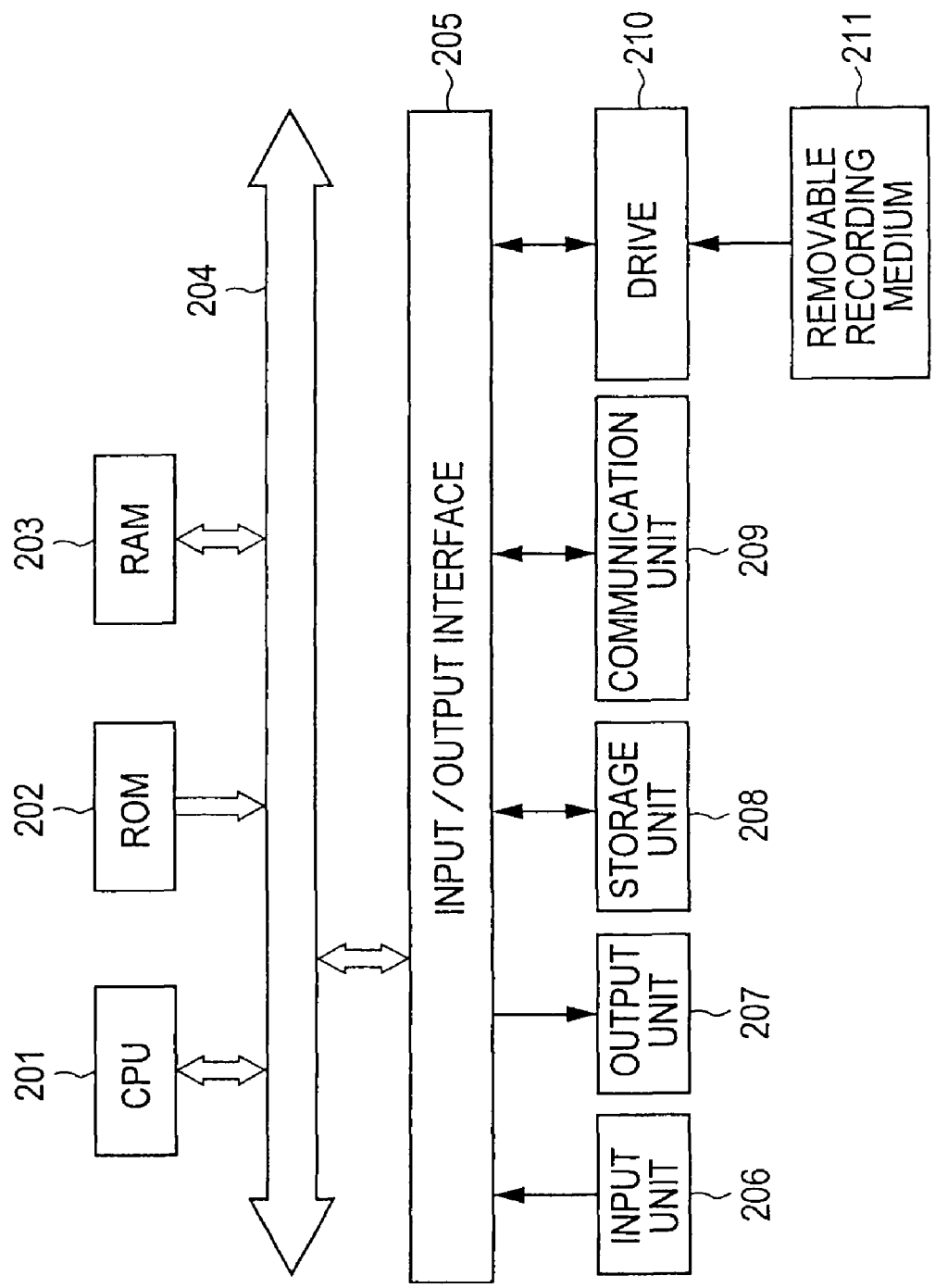
FIG. 11 is a block diagram showing an example of the configuration of an information processing apparatus according to an embodiment of the present invention.

In this case, the entirety or part of the studio-side authoring apparatus 11 shown in FIG. 5 can be formed as, for example, the computer shown in FIG. 11. The part of the studio-side authoring apparatus 11 may be, for example, the entirety of the video signal processor 24 in FIG. 5, or may be part of the video signal processor 24, for example, the main controller 52 shown in FIG. 7, or the like.

Similarly, the entirety or part of the plant-side authoring apparatus 101 shown in FIG. 9 can be formed as, for example, the computer shown in FIG. 11. Similarly to the case of the studio-side authoring apparatus 11, the part of the plant-side authoring apparatus 101 may be, for example, the entirety of the cutting device 113, or may be part (not shown) of the cutting device 113.

Referring to FIG. 11, a central processing unit (CPU) 201 executes various types of processing in accordance with programs recorded in a read-only memory (ROM) 202, or programs loaded from a storage unit 208 into a random access memory (RAM) 203. The RAM 203 also stores data, etc., which are necessary for the CPU 201 to execute the various types of processing.

When the main controller 52 shown in FIG. 7 is formed by, for example, the computer shown in FIG. 11, the VCR control unit 62, the bit assigning unit 63, the encoding control unit 64, etc., can be formed as programs executed by the CPU 201.

The CPU 201, the ROM 202, and the RAM 203 are connected to one another by a bus 204. The bus 204 also connects to an input/output interface 205.

The input/output interface 205 connects to an input unit 206, an output unit 207, the storage unit 208, and a communication unit 209.

The input unit 206 includes, for example, input devices such as a touch panel that is also used as a display unit for the output unit 207, a keyboard, a remote controller including a photoreceiver, and a mouse.

The output unit 207 includes, for example, a single display unit or the like, an audio output device such as a speaker or a headphone output terminal, or a combination of them.

Therefore, when the main controller 52 in FIG. 7 is formed by, for example, the computer in FIG. 11, the GUI 61 can be formed by a combination of programs executed by the input unit 206, the output unit 207, and the CPU 201.

The storage unit 208 is formed by, for example, a hard disk or the like. In addition, the communication unit 209 includes, for example, a modem, a terminal adapter, and a wireless communication device, and controls communication with another information processing apparatus. For example, when the main controller 52 in FIG. 7 is formed by the computer in FIG. 11, the communication unit 109 controls communication between the authoring application executing device 28 and the file server 27 via the network 29, and controls communication between the VCR 51 and the encoder 53.

The input/output interface 205 connects to a drive 210, if necessary. A removable recording medium 211, such as magnetic disk, an optical disc, or a semiconductor memory, is loaded into the drive 210, if necessary. A computer program read from the removable recording medium 211 is installed into the storage unit 208, if necessary.

When software is used to execute the above-described consecutive processing, programs forming the software are installed from a network or recording medium into a computer built into dedicated hardware, or one (e.g., a multipurpose personal computer) that can execute various functions by installing various programs.

Recording media including the above programs include not only the removable recording medium 211 (package media), which is distributed to a user, and which includes a program-recorded magnetic disk (including a floppy disk), optical disc (compact disk read only memory (CD-ROM)), magneto-optical disc (Mini-Disc), or semiconductor memory, but also the ROM 202 and the hard disk in the storage unit 208, which have programs recorded therein, and which are provided to the user in form built into an apparatus.

In this specification, steps that form a program in the recording medium definitely include processing steps performed in a time-series manner in the order given, and include processing steps which are executed in parallel or separately although they are not necessarily executed in a time-series manner.

In addition, the system in this specification represents the entirety of an apparatus including a plurality of devices and processing units.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for recording, in a predetermined recording medium, data output from an encoding means which performs encoding processing, the information processing apparatus comprising:

means for acquiring second encoded video data; and means for recording the second encoded video data acquired by said means for acquiring in the recording medium, wherein an authoring apparatus includes the encoding means for first encoding video data in accordance with first encoding conditions, the first encoding including setting a picture type of each frame of the video data based on at least the first encoding conditions and detecting an amount of bits generated by first encoding each frame of the video data based on the picture type of the frame, preview generating means for generating a preview of the video data in accordance with second encoding conditions including a target amount of bits for each frame of the video data for second encoding the video data and the picture type of each frame of the video data, an input accepting means for accepting input of customization settings and an evaluation indicator with reference to the preview of the video data, the customization settings including instructions to change picture types of respective frames of the video data, and an encoding control means for calculating a total amount of data required for second encoding the video data based on the amount of bits generated by first encoding each frame of the video data, allocating bits in units of a group of pictures (GOP) of the video data based on the total amount of data required for second encoding the video data, to produce an allocation of bits for each GOP, setting the target amount of bits for each frame of the video data for second encoding the video data based on the allocation of bits for each GOP, and updating the second encoding conditions and the target amount of bits for each frame of the video data for second encoding the video data according to the instructions to change picture types, to produce updated second encoding conditions and an updated target amount of bits for each frame of the video data, when the evaluation indicator indicates that the preview of the video data is not acceptable, the encoding processing means further including means for second encoding the video data in accordance with the updated second encoding conditions and the updated target amount of bits when the evaluation indicator indicates that the preview of the video data is acceptable, to produce the second encoded video data acquired by the means for acquiring.

2. An information processing method for an information processing apparatus for recording, in a predetermined recording medium, data output from an encoding processing unit which performs encoding processing, the information processing method comprising:

acquiring second encoded video data; and recording the acquired second encoded video data in the recording medium, wherein a method of authoring apparatus includes first encoding video data in accordance with first encoding conditions, the first encoding including setting a picture type of each frame of the video data based on at least the first encoding conditions, and detecting an amount of bits generated by first encoding each frame of the video data based on the picture type of the frame, generating a preview of the video data in accordance with second encoding conditions including a target amount of bits for each frame of the video data for second encoding the video data and the picture type of each frame of the video data, accepting input of customization settings and an evaluation indicator with reference to the preview of the video data, the customization settings including instructions to change picture types of respective frames of the video data, calculating a total amount of data required for second encoding the video data based on the amount of bits generated by first encoding each frame of the video data, allocating bits in units of a group of pictures (GOP) of the video data based on the total amount of data required for second encoding the video data, to produce an allocation of bits for each GOP, setting the target amount of bits for each frame of the video data for second encoding the video data based on the allocation of bits for each GOP, updating the second encoding conditions and the target amount of bits for each frame of the video data for second encoding the video data according to the instructions to change picture types, to produce updated second encoding conditions and an updated target amount of bits for each frame of the video data, when the evaluation indicator indicates that the preview of the video data is not acceptable, and second encoding the video data in accordance with the updated second encoding conditions and the updated target amount of bits when the evaluation indicator indicates that the preview of the video data is acceptable, to produce the second encoded video data acquired by the acquiring second encoded video data.

3. A non-transitory computer readable storage medium storing computer readable instructions thereon that, when executed by an arithmetic processor, direct the arithmetic processor to perform a method for controlling recording, in a predetermined recording medium, of data output from an encoding processing unit, the method comprising:

acquiring second encoded video data; and recording the acquired second encoded video data in the recording medium, wherein a method of authoring apparatus includes first encoding video data in accordance with first encoding conditions, the first encoding including setting a picture type of each frame of the video data based on at least the first encoding conditions, and detecting an amount of bits generated by first encoding each frame of the video data based on the picture type of the frame, generating a preview of the video data in accordance with second encoding conditions including a target amount of bits for each frame of the video data for second encoding the video data and the picture type of each frame of the video data, accepting input of customization settings and an evaluation indicator with reference to the preview of the video data, the customization settings including instructions to change picture types of respective frames of the video data, calculating a total amount of data required for second encoding the video data based on the amount of bits generated by first encoding each frame of the video data, allocating bits in units of a group of pictures (GOP) of the video data based on the total amount of data required for second encoding the video data, to produce an allocation of bits for each GOP, setting the target amount of bits for each frame of the video data for second encoding the video data based on the allocation of bits for each GOP, updating the second encoding conditions and the target amount of bits for each frame of the video data for second encoding the video data according to the instructions to change picture types, to produce updated second encoding conditions and an updated target amount of bits for each frame of the video data, when the evaluation indicator indicates that the preview of the video data is not acceptable, and second encoding the video data in accordance with the updated second encoding conditions and the updated target amount of bits when the evaluation indicator indicates that the preview of the video data is acceptable, to produce the second encoded video data acquired by the acquiring second encoded video data.

4. An information processing apparatus for recording, in a predetermined recording medium, data output from an encoding processing unit, the information processing apparatus comprising:

an acquiring section configured to acquire second encoded video data; and a recording section configured to record the second encoded video data acquired by said acquiring section in the recording medium, wherein an authoring apparatus includes the encoding processing unit is configured to first encode video data in accordance with first encoding conditions, the first encoding including setting a picture type of each frame of the video data based on at least the first encoding conditions, and detecting an amount of bits generated by first encoding each frame of the video data based on the picture type of the frame, a preview generating unit is configured to generate a preview of the video data in accordance with second encoding conditions including a target amount of bits for each frame of the video data for second encoding the video data and the picture type of each frame of the video data, an input accepting unit is configured to accept input of customization settings and an evaluation indicator with reference to the preview of the video data, the customization settings including instructions to change picture types of respective frames of the video data, and an encoding control unit is configured to calculate a total amount of data required for second encoding the video data based on the amount of bits generated by first encoding each frame of the video data, allocate bits in units of a group of pictures (GOP) of the video data based on the total amount of data required for second encoding the video data, to produce an allocation of bits for each GOP, set the target amount of bits for each frame of the video data for second encoding the video data based on the allocation of bits for each GOP, and update the second encoding conditions and the target amount of bits for each frame of the video data for second encoding the video data according to the instructions to change picture types, to produce updated second encoding conditions and an updated target amount of bits for each frame of the video data, when the evaluation indicator indicates that the preview of the video data is not acceptable, the encoding processing unit being further configured to second encode the video data in accordance with the updated second encoding conditions and the updated target amount of bits when the evaluation indicator indicates that the preview of the video data is acceptable, to produce the second encoded video data acquired by the acquiring section.

5. An information processing system for recording, in a predetermined recording medium, data output from an encoding processing unit, the information processing system comprising:

a studio-side authoring apparatus including a first encoding processing unit configured to first encode video data in accordance with first encoding conditions, the first encoding including setting a picture type of each frame of the video data based on at least the first encoding conditions, and detecting an amount of bits generated by first encoding each frame of the video data based on the picture type of the frame, a preview generating unit configured to generate a preview of the video data in accordance with second encoding conditions including a target amount of bits for each frame of the video data for second encoding the video data and the picture type of each frame of the video data, an input accepting unit configured to accept input of customization settings and an evaluation indicator with reference to the preview of the video data, the customization settings including instructions to change picture types of respective frames of the video data, an encoding control unit configured to calculate a total amount of data required for second encoding the video data based on the amount of bits generated by first encoding each frame of the video data, allocate bits in units of a group of pictures (GOP) of the video data based on the total amount of data required for second encoding the video data, to produce an allocation of bits for each GOP, set the target amount of bits for each frame of the video data for second encoding the video data based on the allocation of bits for each GOP, and update the second encoding conditions and the target amount of bits for each frame of the video data for second encoding the video data according to the instructions to change picture types, to produce updated second encoding conditions and an updated target amount of bits for each frame of the video data, when the evaluation indicator indicates that the preview of the video data is not acceptable, and a second encoding processing unit configured to second encode the video data in accordance with the updated second encoding conditions and the updated target amount of bits when the evaluation indicator indicates that the preview of the video data is acceptable, to produce second encoded video data; and a plant-side authoring apparatus including
   an acquiring section configured to acquire the second encoded video data, and
   a recording section configured to record the second encoded video data in the recording medium.

6. The information processing apparatus according to claim 1, wherein the encoding processing unit is further configured to first encode the video data by performing fixed quantization.

\* \* \* \* \*